United States Patent
Hanazawa

(10) Patent No.: US 9,431,010 B2
(45) Date of Patent: Aug. 30, 2016

(54) SPEECH-RECOGNITION DEVICE AND SPEECH-RECOGNITION METHOD

(71) Applicant: Toshiyuki Hanazawa, Chiyoda-ku (JP)

(72) Inventor: Toshiyuki Hanazawa, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/655,141

(22) PCT Filed: Mar. 6, 2013

(86) PCT No.: PCT/JP2013/056142
§ 371 (c)(1),
(2) Date: Jun. 24, 2015

(87) PCT Pub. No.: WO2014/136222
PCT Pub. Date: Sep. 12, 2014

(65) Prior Publication Data
US 2016/0005400 A1    Jan. 7, 2016

(51) Int. Cl.
| | | |
|---|---|---|
| G10L 15/00 | (2013.01) | |
| G10L 15/18 | (2013.01) | |
| G10L 15/32 | (2013.01) | |
| G06F 17/27 | (2006.01) | |
| G10L 15/30 | (2013.01) | |

(52) U.S. Cl.
CPC .......... *G10L 15/18* (2013.01); *G06F 17/2735* (2013.01); *G10L 15/32* (2013.01); *G10L 15/30* (2013.01)

(58) Field of Classification Search
CPC ....... G10L 15/30; G10L 15/32; G10L 15/18; G10L 15/187; G10L 15/02; G10L 2015/025
USPC ....... 704/231, 235, 250, 257, 255, 240, 252, 704/270, 270.1, 233, 251, 275
See application file for complete search history.

(56) References Cited

U.S. PATENT DOCUMENTS

| | | | | |
|---|---|---|---|---|
| 7,228,275 B1* | 6/2007 | Endo | ............... | G10L 15/32 |
| | | | | 704/231 |
| 2012/0215528 A1* | 8/2012 | Nagatomo | ............ | G10L 15/22 |
| | | | | 704/211 |
| 2013/0132084 A1* | 5/2013 | Stonehocker | .......... | G10L 15/30 |
| | | | | 704/244 |

FOREIGN PATENT DOCUMENTS

| | | |
|---|---|---|
| JP | 2003 323196 | 11/2003 |
| JP | 2004 198831 | 7/2004 |
| JP | 2005 37662 | 2/2005 |
| JP | 2010 85536 | 4/2010 |
| JP | 2010 91675 | 4/2010 |

OTHER PUBLICATIONS

International Search Report Issued Apr. 16, 2013 in PCT/JP2013/056142 Filed Mar. 6, 2013.

\* cited by examiner

*Primary Examiner* — Huyen Vo
(74) *Attorney, Agent, or Firm* — Oblon, McClelland, Maier & Neustadt, L.L.P

(57) ABSTRACT

With respect to speech data 4 of an input speech 2, a speech-recognition device 1 performs at an internal recognizer 7, recognition processing using an acoustic model 9, to calculate an internal recognition result 10 and its acoustic likelihood. A reading-addition processor 12 acquires an external recognition result 11 from recognition processing of the speech data 4 of the input speech 2 by an external recognizer 19 and adds a reading thereto, and a re-collation processor 15 calculates, using the acoustic model 9, the acoustic likelihood of the external recognition result 11 to provide a re-collation result 16. A result-determination processor 17 compares the acoustic likelihood of the internal recognition result 10 with the acoustic likelihood of the external recognition result 11 included in the re-collation result 16, to thereby determine a final recognition result 18.

10 Claims, 8 Drawing Sheets

FIG.2

| Notation | Reading |
|---|---|
| Yokohama International Stadium | yokohamakokusaikyoogizyoo |
| Suzuki Liquor Store | suzukisaketeN |
| ... | ... |

FIG.3

| Notation | Reading |
|---|---|
| Morning Sun | asahi |
| ... | ... |
| Stairs | kaidaN |
| ... | ... |
| Maihama International Stadium | maihamakokusaikyoogizyoo |
| ... | ... |

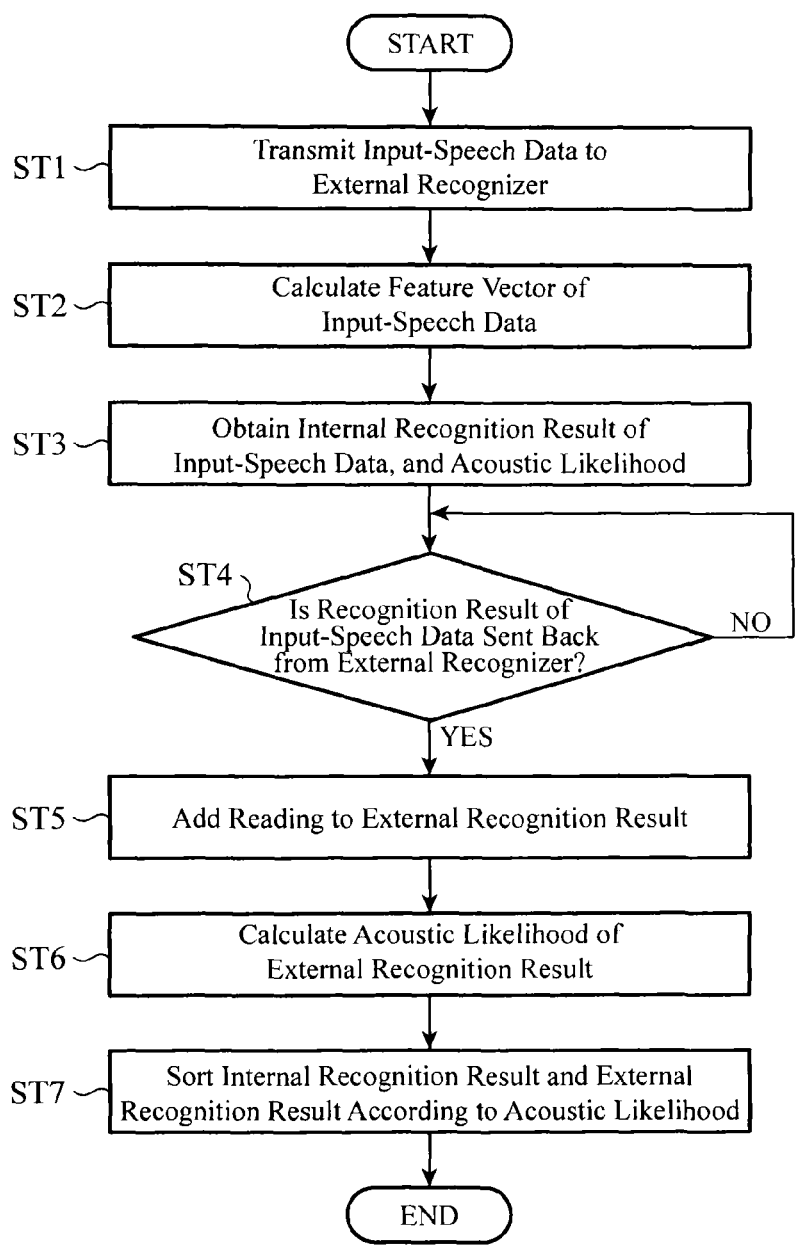

FIG.8

| Notation | Reading |
|---|---|
| Autumn | aki |
| Autumn | shuu |
| ... | ... |
| Bell | suzu |
| Bell | rei |
| ... | ... |
| Deer | sika |
| Deer | ka |
| ... | ... |
| Slope | saka |
| ... | ... |

FIG.10

| Notation | Language Likelihood |
|---|---|
| Yokohama International Stadium | -0.15 |
| Maihama International Stadium | -0.12 |
| Suzuka Slope | -0.30 |
| Suzuki Liquor Store | -0.32 |
| ... | ... |

SPEECH-RECOGNITION DEVICE AND SPEECH-RECOGNITION METHOD

TECHNICAL FIELD

The present invention relates to a speech-recognition device and a speech-recognition method for acquiring recognition results respectively from an external speech recognizer and an internal speech-recognizer to thereby determine a final recognition result.

BACKGROUND ART

When speech recognition is to be performed using an instrument such as a car-navigation device, a smartphone and the like, such an instrument not necessarily has sufficient hardware resources. For that reason, there is a client-server speech-recognition system in which, instead of internally executing all of speech recognition of a speech, the instrument transmits its speech data to an external server followed by receiving a result of speech recognition performed by the server. Note that the "client" herein means an instrument at user's hand, such as a car-navigation device, a smartphone, and the like. Consequently, even at the client, it becomes possible to utilize large-vocabulary based speech recognition. However, a recognition word specific to the client, a proper noun only found in an address book of the user, and the like are not necessarily recognizable by the server.

As a measure therefor, in Patent Document 1, there is disclosed a technique of not only merely performing speech recognition by the server followed by receiving the result by the client, but also performing, depending on a speech, speech recognition both by the client and by the server followed by differently indicating both of the recognition results or selecting either one of the results. Specifically, in Patent Document 1, there is described that, when either one of the recognition results by the client or the server is to be selected, a higher one in acoustic likelihood is selected.

CITATION LIST

Patent Document

Patent Document 1: Japanese Patent Application Laid-open No. 2010-85536

SUMMARY OF THE INVENTION

Problems to be Solved by the Invention

In the case of the conventional client-server speech-recognition method, at the time of selecting either one of the recognition results by the client or the server, it is required to compare between their recognition scores, their likelihoods, etc. that are values indicative of certainties of both recognition results; however, there are cases where such information can not be obtained from the server-side. Further, if obtained, there is no assurance that it has been calculated on the same basis as in speech recognition in the client-side. Thus, there is a problem that, when either one of the recognition results by the client or the server is to be selected, in some cases, exact comparison therebetween can not be made, so that a sufficient accuracy in speech recognition is not achieved.

This invention has been made to solve the problem as described above, and an object thereof is to provide a speech-recognition device and a speech-recognition method by which the recognition result by the client and the recognition result by the server are compared with each other under same conditions to thereby enhance a final recognition accuracy.

Means for Solving the Problems

A speech-recognition device of the invention comprises: an acoustic model in which feature quantities of speeches are modelized; a language model in which notations and readings of more than one recognition-object words of the speech-recognition device are stored; a reading dictionary in which pairs of notations and readings of the recognition-object words and other words than the recognition-object words are stored; an analyzer that analyzes input speech data to calculate a feature vector; an internal recognizer that performs, using the acoustic model, pattern collation between the feature vector calculated by the analyzer and each of words stored in the language model to thereby calculate their respective acoustic likelihoods, followed by outputting, as an internal recognition result, the notations, the readings and the acoustic likelihoods of top one or more high-ranking words in the acoustic likelihoods; a reading-addition processor that acquires an external recognition result from recognition processing of the input speech data by an external recognizer, adds a reading for said external recognition result by use of the reading dictionary, and outputs a reading-added result composed of said external recognition result and the reading therefor; a re-collation processor that performs, using the acoustic model, pattern collation between the feature vector calculated by the analyzer and the reading-added result outputted by the reading-addition processor, to thereby calculate an acoustic likelihood for the external recognition result; and a result-determination processor that compares the acoustic likelihoods of the internal recognition result with the acoustic likelihood of the external recognition result, to thereby determine a final recognition result.

A speech-recognition method of the invention comprises: a transmission step of transmitting input speech data to an external recognizer; an analysis step of analyzing the input speech data to calculate a feature vector; an internal recognition step of performing, using an acoustic model in which feature quantities of speeches are modelized, pattern collation between the feature vector calculated in the analysis step and each of words stored in a language model in which notations and readings of more than one recognition-object words of the speech-recognition device are stored, to thereby calculate their respective acoustic likelihoods, followed by outputting, as an internal recognition result, the notations, the readings and the acoustic likelihoods of top one or more high-ranking words in the acoustic likelihoods; a reading-addition step of acquiring an external recognition result from recognition processing of the input speech data by the external recognizer, adding a reading for said external recognition result by use of a reading dictionary in which pairs of notations and readings of the recognition-object words and other words than the recognition-object words are stored, and outputting a reading-added result composed of said external recognition result and the reading therefor; a re-collation step of performing, using the acoustic model, pattern collation between the feature vector calculated in the analysis step and the reading-added result outputted in the reading-addition step, to thereby calculate the acoustic likelihood for the external recognition result; and a result-determination step of comparing the acoustic likelihood of the internal recognition result with the acoustic likelihood of the external recognition result, to thereby determine a final recognition result.

Effect of the Invention

According to the invention, it is possible to provide a speech-recognition device and a speech-recognition method by which the acoustic likelihood of the internal recognition result and the acoustic likelihood of the external recognition result are calculated using the same acoustic model and compared with each other, so that the final recognition accuracy is enhanced.

BRIEF DESCRIPTION OF THE DRAWINGS

FIG. 2 is a diagram for illustrating an example of details of a language model included in the speech-recognition device according to Embodiment 1.

FIG. 3 is a diagram illustrating an example of details of a reading dictionary included in the speech-recognition device according to Embodiment 1.

FIG. 4 is a flowchart showing operations of the speech-recognition device according to Embodiment 1.

FIG. 5 is a diagram illustrating, as a modified example, an example of details of a reading dictionary in English of the speech-recognition device according to Embodiment 1.

FIG. 8 is a diagram illustrating an example of details of a reading dictionary included in the speech-recognition device according to Embodiment 3.

FIG. 10 is a diagram illustrating an example of details of a result-determination language model included in the speech-recognition device according to Embodiment 4.

MODES FOR CARRYING OUT THE INVENTION

Hereinafter, for illustrating the invention in more detail, embodiments for carrying out the invention will be described according to the accompanying drawings.

Embodiment 1

Figure 1:
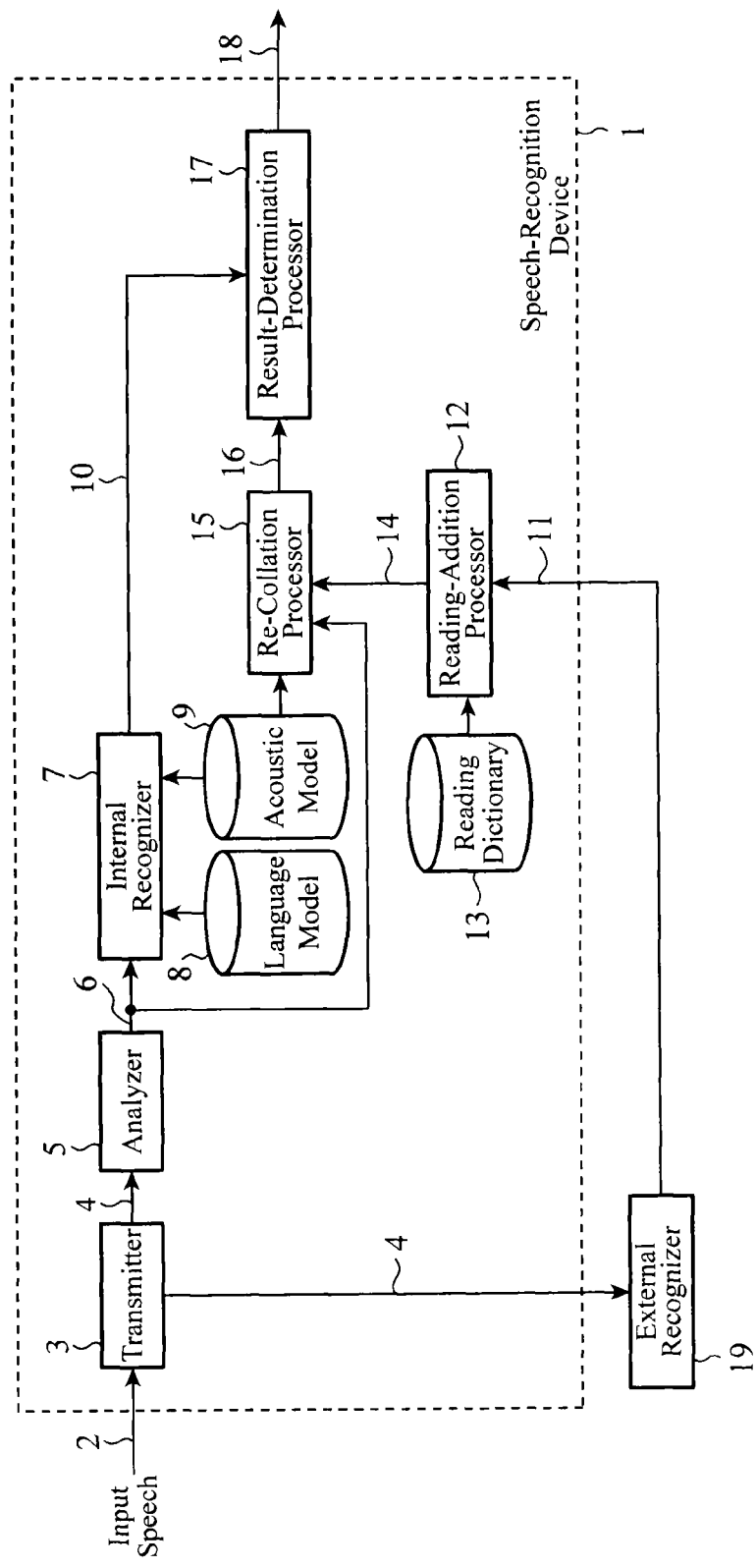
FIG. 1 is a block diagram showing a configuration of a speech-recognition device according to Embodiment 1 of the invention.

As shown in FIG. 1, a speech-recognition device 1 according to Embodiment 1 includes a transmitter 3, an analyzer 5, an internal recognizer 7, a language model 8, an acoustic model 9, a reading-addition processor 12, a reading dictionary 13, a re-collation processor 15 and a re-collation result 16. The speech-recognition device 1 corresponds to a client for constituting a client-server speech-recognition system, which may be mounted in or installed in an existing instrument, for example, a smartphone or like portable instrument carried by a user, a navigation device mounted on or brought into a vehicle or like moving object, or the like; or may be used instead as a separate unit.

An external recognizer 19 is assumed to be a speech-recognition server connected to the speech-recognition device 1 through a network. It may be directly connected by wire or wirelessly, without through a network.

In the speech-recognition device 1, the acoustic model 9 is storing therein acoustic models obtained from modelization of feature vectors of speeches. In Embodiment 1, the acoustic models are assumed to be obtained from modelization of phonemes, and in the acoustic model 9, there are stored the acoustic models for all phonemes. With the acoustic models for all phonemes, it is possible to modelize a feature vector of a speech about any word, by making access to an acoustic model of its phoneme.

Note that the feature vector to be modelized by the acoustic model 9 (namely, a feature vector 6 in FIG. 1) is assumed, for example, to be an MFCC (Mel Frequency Cepstral Coefficient). Further, the acoustic model is assumed, for example, to be an HMM (Hidden Markov Model).

The language model 8 is storing therein notations and readings of recognition-object words of the internal recognizer 7. Note that "reading" referred to herein means a symbol sequence that can be associated with the acoustic model 9. For example, if the acoustic model 9 is that in which phonemes are modelized, the readings in the language model 8 are phoneme sequences or the like. In Embodiment 1, the recognition objects of the speech-recognition device 1 are assumed to be facility names in Kanagawa Prefecture. An example of details of the language model 8 in this case is shown in FIG. 2. In FIG. 2, phoneme sequences are used as the readings.

The reading dictionary 13 is storing therein pairs of notations and readings of a large number of words including also words not subject to the recognition by the internal recognizer 7. Note that "reading" is, similarly to the language model 8, assumed to be a symbol sequence that can be associated with the acoustic model 9. In Embodiment 1, the readings in the reading dictionary 13 are phoneme sequences. An example of details of the reading dictionary 13 is shown in FIG. 3.

These language model 8, acoustic model 9 and reading dictionary 13 may be stored in a common memory element, memory device or the like, or may be stored in independent memory elements, memory devices or the like, respectively.

Further, it is allowable to configure the speech-recognition device 1 to have a memory storing a program and a CPU for implementing the program so that, when the CPU implements the program, the functions (details will be described later) carried by the transmitter 3, the analyzer 5, the internal recognizer 7, the reading-addition processor 12, the re-collation processor 15 and the result-determination processor 17 are achieved by software. Instead, a part of the functions may be achieved by hardware.

Next, operations at the time of speech recognition will be described with reference to the flowchart in FIG. 4.

In Step ST1, when a user makes a speech, an input speech 2 about that speech is inputted to the transmitter 3. The transmitter 3 A-D converts the input speech 2 into speech data 4, and outputs the data to the analyzer 5. In addition, the transmitter 3 transmits the same speech data 4 to the external recognizer 19.

In Step ST2, the analyzer 5 converts the speech data 4 into a feature vector 6 and outputs it to the internal recognizer 7 and the re-collation processor 15. As mentioned above, the feature vector 6 is assumed to be an MFCC, for example.

In Step ST3, using the language model 8 and the acoustic model 9, the internal recognizer 7 performs according to, for example, a Viterbi algorithm, pattern collation (pattern matching) between the feature vector 6 and each of the words written in the language model 8, to thereby calculate their respective acoustic likelihoods, followed by selecting the word whose acoustic likelihood is highest and outputting it to the result-determination processor 17 as an internal recognition result 10.

Note that, here, a case is described where only the top one high-ranking word in acoustic likelihood is included in the internal recognition result 10; however, this is not limitative, and it is allowable to configure so that, for example, top one or more high-ranking words in acoustic likelihood are included in the internal recognition result 10.

The internal recognition result 10 is composed of a notation, reading and acoustic likelihood of the word [Kanji]. For example, when the input speech 2 is "Maihama International Stadium (maihamakokusaikyoogizyoo)", although there is no same word in the language model 8, a word whose acoustic likelihood is highest among the words in the language model 8 is outputted. In this example, let's assume that the acoustic likelihood of "Yokohama International Stadium (yokohamakokusaikyoogizyoo)" is highest. Accordingly, the internal recognizer 7 outputs the notation "Yokohama International Stadium", reading "yokohamakokusaikyoogizyoo" and acoustic likelihood of that word, as the internal recognition result 10.

In Step ST4, the reading-addition processor 12 waits for an external recognition result 11 sent back from the external recognizer 19. Note that in Embodiment 1, it is presumed that the external recognition result 11 at least includes a notation of the word that is a recognition result of the speech data 4, but does not include a reading of that word.

The reading-addition processor 12, when received the external recognition result 11 (Step ST4 "YES"), refers to the reading dictionary 13 to thereby extract therefrom a reading of a notation matched to the notation of the word included in the external recognition result 11, and outputs the reading to the re-collation processor 15 as a reading-added result 14 (Step ST5). For example, when the external recognition result 11 is "Maihama International Stadium", the reading-addition processor 12 refers to the reading dictionary 13 to thereby extract the matched notation "Maihama International Stadium" and its reading "maihamakokusaikyoogizyoo", and outputs them as the reading-added result 14.

In Step ST6, the re-collation processor 15 uses as its inputs, the feature vector 6 and the reading-added result 14, and performs, using the same acoustic model as used in pattern collation in the internal recognizer 7, namely using the acoustic model 9, pattern collation between the reading of the feature vector 6 and the reading in the reading-added result 14, to thereby calculate an acoustic likelihood for the reading-added result 14. The pattern collation method by the re-collation processor 15 is assumed to be the same as the pattern collation method used in the internal recognizer 7. In Embodiment 1, the Viterbi algorithm is used.

Because the re-collation processor 15 uses in this manner, the same acoustic model and pattern collation method as for the internal recognizer 7, the acoustic likelihood of the internal recognition result 10 calculated by the internal recognizer 7 and that of the external recognition result 11 calculated by the external recognizer 19 become comparable with each other. The re-collation processor 15 outputs the re-collation result 16 composed of the reading-added result 14 and the calculated acoustic likelihood to the result-determination processor 17.

In Step ST7, the result-determination processor 17 uses as its inputs, the internal recognition result 10 and the re-collation result 16, sorts the recognition results in descending order of the acoustic likelihood, and outputs them as a final recognition result 18. In the example described above, since the input speech 2 is "Maihama International Stadium", the internal recognition result 10 by the internal recognizer 7 is "Yokohama International Stadium" and the external recognition result 11 by the external recognizer 19 is "Maihama International Stadium", when pattern collation is performed using the same acoustic model 9 to thereby calculate the respective acoustic likelihoods, it is expected that "Maihama International Stadium" by the external recognizer 19 becomes higher in acoustic likelihood than the other. This contributes to improving the accuracy in speech recognition.

Consequently, according to Embodiment 1, the speech-recognition device 1 is configured to include: the acoustic model 9 in which feature quantities of speeches are modelized; the language model 8 in which notations and readings of more than one recognition-object words of the speech-recognition device 1 are stored; the reading dictionary 13 in which pairs of notations and readings of a large number of words including not only the recognition-object words but also other words than the recognition-object words are stored; the analyzer 5 that analyzes the speech data 4 of the input speech 2 to calculate the feature vector 6; the internal recognizer 7 that performs, using the acoustic model 9, pattern collation between the feature vector 6 calculated by the analyzer 5 and each of words stored in the language model 8, to thereby calculate their respective acoustic likelihoods, followed by outputting, as the internal recognition result 10, the notations, the readings and the acoustic likelihoods of top one or more high-ranking words in the acoustic likelihoods; the reading-addition processor 12 that acquires the external recognition result 11 from recognition processing of the speech data 4 by the external recognizer 19, adds a reading for the external recognition result 11 by use of the reading dictionary 13, and outputs the reading-added result 14 composed of the external recognition result 11 and the reading therefor; the re-collation processor 15 that performs, using the acoustic model 9, pattern collation between the feature vector 6 calculated by the analyzer 5 and the reading-added result 14 outputted by the reading-addition processor 12, to thereby calculate an acoustic likelihood for the external recognition result 11; and the result-determination processor 17 that compares the acoustic likelihoods of the internal recognition result 10 with the acoustic likelihood of the re-collation recognition result 16, to thereby determine the final recognition result. Thus, the acoustic likelihood can be calculated for the external recognition result 11 by using the same acoustic model and pattern collation method as for the internal recognizer 7, so that exact comparison can be made between the acoustic likelihood of the external recognition result 11 and the acoustic likelihood of the internal recognition result 10, thus making it possible to enhance the final recognition accuracy. Accordingly, even in the case, for example, where the speech-recognition device 1 has insufficient hardware resources and the number of words in the language mode 8 is small, it is possible to utilize the recognition result by the external recognizer 19 having a large-scale language model, thus providing an effect that the recognition performance of the speech-recognition device 1 is improved.

Note that the speech-recognition device 1 according to Embodiment 1 is also applicable to a language other than Japanese. For example, when the speech-recognition device 1 is to be applied to English, it suffices to change the language model 8, the acoustic model 9 and the reading dictionary 13 to the respective corresponding ones for English. In that case, it suffices to record notations and readings of a large number of English words in the reading dictionary 13. Note that the readings in the reading dictionary 13 are provided as indications that can be associated with the acoustic model 9. For example, if the acoustic model 9 comprises English phonemes, the readings in the reading dictionary 13 are provided as phoneme indications or symbols convertible to the phoneme indications. In FIG. 5, an example of English reading dictionary 13 is shown. Written at the first column in FIG. 5 are the notations and at the second column are the phoneme indications as the readings of those notations.

Meanwhile, in the reading dictionary 13, readings of a large number of words are stored so as to avoid no presence of the word matched to a word in the external recognition result 11. For a case where the matched word is nevertheless not present in the reading dictionary 13, it suffices to determine beforehand which one of the recognition results by the internal recognizer 7 and the external recognizer 19 is to be selected so that the result-determination processor 17 provides the thus-determined recognition result as the final result.

Embodiment 2

Figure 6:
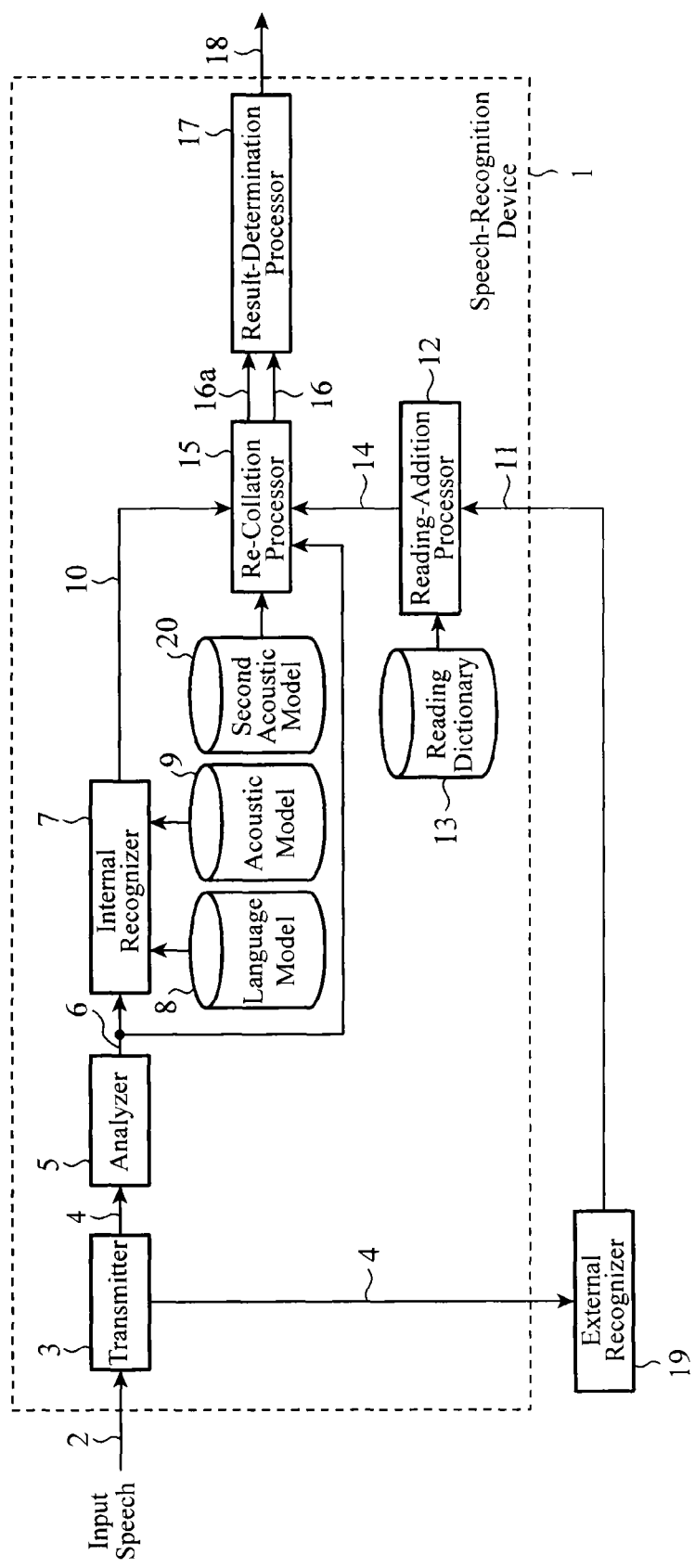
FIG. 6 is a block diagram showing a configuration of a speech-recognition device according to Embodiment 2 of the invention.

FIG. 6 is a block diagram showing a configuration of a speech-recognition device 1 according to Embodiment 2. In FIG. 6, the same reference numerals are given to the same or equivalent parts as those in FIG. 1, so that their description is omitted here. The speech-recognition device 1 according to Embodiment 2 is characterized by the addition of a second acoustic model 20.

Similarly to the acoustic model 9 in Embodiment 1, the second acoustic model 20 is storing therein acoustic models obtained from modelization of feature vectors of speeches. It should be noted that, the second acoustic model 20 is assumed to be an acoustic model that is more precise and is higher in recognition accuracy than the acoustic model 9. For example, in a case where phonemes are to be modelized in this acoustic model, triphone phonemes in consideration of not only a target phoneme for modelization, but also before-after phonemes of the target phoneme, are assumed to be modelized. In the case of triphone, the second phoneme /s/ in "Morning/asa" and the second phoneme /s/ in "Stone/isi" are, since they are different in before-after phonemes, modelized into different acoustic models. It is known that this enhances the recognition accuracy. However, variations of acoustic models increase, so that the calculation amount at the pattern collation is increased.

Figure 7:
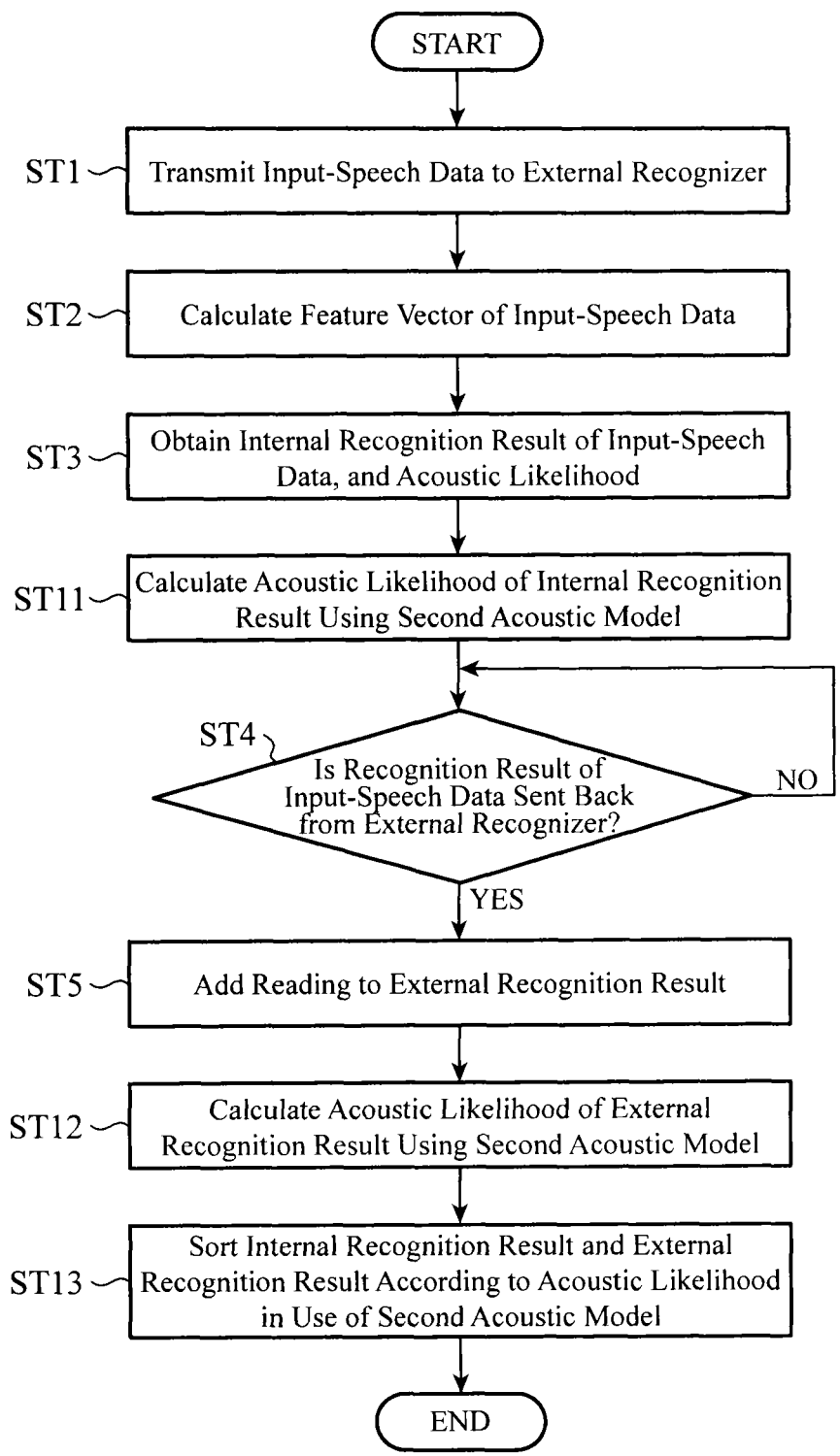
FIG. 7 is a flowchart showing operations of the speech-recognition device according to Embodiment 2.

Next, operations at the time of speech recognition will be described with reference to the flowchart in FIG. 7.

When a user makes a speech, the transmitter 3 A-D converts the input speech 2 into speech data 4, and outputs the data to the analyzer 5 and the external recognizer 19 (Step ST1). The analyzer 5 and the internal recognizer 7 perform the same operations as those in Embodiment 1 (Steps ST2 and ST3) to thereby output the internal recognition result 10. It should be noted that, in Step ST3 in Embodiment 1, the internal recognition result 10 is outputted from the internal recognizer 7 to the result-determination processor 17; however, in Step ST3 in Embodiment 2, it is outputted from the internal recognizer 7 to the re-collation processor 15.

In Step ST11, the re-collation processor 15 uses as its inputs, the feature vector 6 and the internal recognition result 10, and performs, using the second acoustic model 20, pattern collation between the reading of the feature vector 6 and the reading in the internal recognition result 10, to thereby calculate an acoustic likelihood for the internal recognition result 10. Although the pattern collation method at this time is not necessarily the same as the method used by the internal recognizer 7, the Viterbi algorithm is used in Embodiment 2. The re-collation processor 15 outputs the re-collation result 16a composed of the internal recognition result 10 and the calculated acoustic likelihood to the result-determination processor 17.

Note that, as aforementioned, since the second acoustic model 20 has variations of the models more than those in the acoustic model 9, the calculation amount required for the pattern collation is increased; however, the recognition objects of the re-collation processor 15 are limited to the words included in the internal recognition result 10, so that an increase in processing load can be suppressed to be small.

The reading-addition processor 12 performs the same operations as those in Embodiment 1 (Steps ST4 and ST5), to thereby obtain the reading-added result 14 for the external recognition result 11 and output it to the re-collation processor 15.

In Step ST12, when the reading-added result 14 is inputted, the re-collation processor 15 obtains, through similar operations to those in Embodiment 1, the re-collation result 16 composed of the reading-added result 14 and its acoustic likelihood, and outputs it to the result-determination processor 17. Note that the second acoustic model 20 is used for the pattern collation.

In Step ST13, the result-determination processor 17 uses as its inputs, the re-collation result 16a with respect to the internal recognition result 10 and the re-collation result 16 with respect to the external recognition result 11, sorts the recognition results in descending order of the acoustic likelihood, and outputs them as the final recognition result 18.

Consequently, according to Embodiment 2, the speech-recognition device 1 is configured to include the second acoustic model 20 different to the acoustic model 9, wherein, using the second acoustic model 20, the re-collation processor 15 performs pattern collation between the feature vector 6 calculated by the analyzer 5 and the internal recognition result 10 outputted by the internal recognizer 7, to thereby calculate an acoustic likelihood (re-collation result 16a) for the internal recognition result 10, and performs pattern collation between the feature vector 6 and the reading-added result 14 outputted by the reading-addition processor 12, to thereby calculate an acoustic likelihood (re-collation result 16) for the external recognition result 11; and wherein the result-determination processor 17 determines the final recognition result by comparing with each other, the acoustic likelihood of the internal recognition result 10 and the acoustic likelihood of the external recognition result 11 which have been calculated by the re-collation processor 15. Accordingly, the re-collation is performed using the second acoustic model 20 that is more precise and is higher in recognition accuracy than the acoustic model 9, so that the comparison between the acoustic likelihood of the external recognition result 11 and the acoustic likelihood of the internal recognition result 10 becomes more exact, thus providing an effect of improving the recognition accuracy.

Note that the reason of not using the second acoustic model 20 in the internal recognizer 7 resides in the fact that when the second acoustic model 20 is used in the pattern collation by the internal recognizer 7, because the variations of models increases to more than those in the acoustic model 9, the calculation amount at the time of the pattern collation is increased. When different kinds of models are used respectively in the acoustic model 9 and the second acoustic model 20 as in Embodiment 2, there is an effect that the recognition accuracy is enhanced while suppressing an increase in calculation amount to be small.

Embodiment 3

A speech-recognition device according to Embodiment 3 has a configuration that is, on a figure basis, similar to that of the speech-recognition device 1 shown in FIG. 1 or FIG. 6. Thus, in the followings, description will be made using FIG. 1 in a diverted manner. In the speech-recognition device 1 according to Embodiment 3, the details in the reading dictionary 13 and the operations of the reading-addition processor 12 and the re-collation processor 15 are modified as described later.

FIG. 8 is a diagram showing an example of details of a reading dictionary 13 of the speech-recognition device according to Embodiment 3. In the speech-recognition device 1 according to Embodiment 3, the reading dictionary 13 is also storing therein, other than the dictionary of the words and the facility names shown in FIG. 3, a dictionary of words in unit of about one character shown in FIG. 8. Because of having the small-unit word elements in unit of about one character as just described, it becomes possible to add a reading to each of a variety of notations in the external recognition result 11.

Next, operations at the time of speech recognition will be described.

When a user makes a speech, the transmitter 3 A-D converts the input speech 2 into speech data 4, and outputs the data to the analyzer 5 and the external recognizer 19. The analyzer 5 and the internal recognizer 7 perform the same operations as those in Embodiment 1 to thereby output the internal recognition result 10. In the case, for example, where the input speech 2 is "Suzuka Slope (suzukasaka)", although the "Suzuka Slope" is absent in the language model 8, pattern collation is performed between that speech and each of the words written in the language model 8, so that the word whose acoustic likelihood is highest is outputted. In Embodiment 3, it is assumed that the acoustic likelihood of "Suzuki Liquor Store (suzukisaketen)" is highest. Accordingly, the internal recognizer 7 outputs the notation, reading and acoustic likelihood of that word as the internal recognition result 10.

The reading-addition processor 12 waits for an external recognition result 11 sent back from the external recognizer 19, and when received the external recognition result 11, refers to the reading dictionary 13 shown in FIG. 8 to thereby extract therefrom a reading of a notation matched to the notation of the word (for example, "Suzuka Slope") included in the external recognition result 11. In the reading dictionary 13, if there is a plurality of readings corresponding to the notation in the external recognition result 11, the reading-addition processor outputs the plurality of readings. Further, if there is no reading corresponding to the notation, the reading-addition processor extracts notations in the reading dictionary 13 that are able to constitute, when coupled together, the notation of the external recognition result 11. This extraction operation can be made, for example, by subjecting the notation of the external recognition result 11 to a continuous DP (Dynamic Programming) matching on a minimum division-number basis, using all of the notations in the reading dictionary 13 as recognition objects.

In the example of Embodiment 3, in the reading dictionary 13, there is no notation matched to "Suzuka Slope" of the external recognition result 11, so that the reading-addition processor 12 extracts the notations "Bell", "Deer" and "Slope" (each a single Kanji character constituting "Suzuka Slope") existing in the reading dictionary 13. If there is a plurality of readings for the thus-extracted notation, all of reading combinations are extracted. In this case, there are respective two readings "suzu" and "rei" for the notation "Bell", and "sika" and "ka" for the notation "Deer", and one reading "saka" for the notation "Slope", so that four readings "suzushikasaka", "reishikasaka", "suzukasaka" and "reikasaka" are extracted as readings for "Suzuka Slope" of the external recognition result 11. Then, the reading-addition processor 12 outputs, as the reading-added result 14, the extracted four readings with the notation "Suzuka Slop".

The re-collation processor 15 uses as its inputs, the feature vector 6 and the reading-added result 14, and performs, using the same acoustic model 9 as used in the pattern collation by the internal recognizer 7, pattern collation between the reading of the feature vector 6 and each of the plurality of readings in the reading-added result 14, to thereby calculate from the reading whose acoustic likelihood is highest in the reading-added result 14, this acoustic likelihood as the acoustic likelihood for the reading-added result 14. The re-collation processor 15 outputs the re-collation result 16 composed of the reading-added result 14 and the calculated acoustic likelihood.

In this manner, when there is a plurality of readings as candidates for the notation of the word in the external recognition result 11, it is possible to determine the reading and calculates its acoustic likelihood by performing pattern collation between the feature vector 6 and the plurality of readings in the re-collation processor 15. In the example described above, among the four readings for "Suzuka Slope" in the external recognition result 11, the reading "suzukasaka" whose acoustic likelihood is highest is included in the re-collation result 16.

The result-determination processor 17 uses as its inputs, the internal recognition result 10 and the re-collation result 16, performs the same operation as in Embodiment 1 to thereby sort the recognition results in descending order of the acoustic likelihood, and outputs them as the final recognition result 18. In the example described above, since the input speech 2 is "Suzuka Slope", the internal recognition result 10 by the internal recognizer 7 is "Suzuki Liquor Store" and the external recognition result 11 by the external recognizer 19 is "Suzuka Slope" (suzukasaka), when pattern collation is performed using the same acoustic model 9 to thereby calculate their respective acoustic likelihoods, it is expected that "Suzuka Slope" (suzukasaka) by the external recognizer 19 becomes higher in acoustic likelihood than the other. This contributes to improving the accuracy in speech recognition.

Consequently, according to Embodiment 3, it is configured, with respect to the reading-added result 14, so that when there is a plurality of readings as candidates for the external recognition result 11 in the reading dictionary 13, such a reading-added result 14 in which said plurality of readings is added, is outputted, and the re-collation processor 15 performs pattern collation for each of the readings included in the reading-added result 14 to thereby calculate respective acoustic likelihoods, selects a reading that is highest in said acoustic likelihood, and outputs it to the result-determination processor 17. Thus, even when it is unable to univocally determine the reading only from the notation in the external recognition result 11, it becomes possible to determine the reading and calculate its acoustic likelihood by performing pattern recognition with the feature vector 6 at the re-collation processor 15, thus providing an effect that the accuracy in speech-recognition is improved.

Further, for the reading dictionary 13 of Embodiment 3, notations and readings are given on a smaller-unit basis than on a word basis, which results in allowing a large variety of words to be prepared by their combinations, thus providing a merit of making higher the probability that a matched notation will be found. In contrast, for the reading dictionary 13 of Embodiment 1, since notations and readings are given on a word basis, there is provided a merit that the accuracy in reading-addition is high.

Note that in Embodiment 3, description has been made about the case where, with respect to the speech-recognition device 1 of Embodiment 1, the operations of the reading-addition processor 12 and the re-collation processor 15 are modified; however, with respect also to the speech-recognition device 1 of Embodiment 2, the operations of its reading-addition processor 12 and the re-collation processor 15 may be modified similarly, and this provides the same effect for a case where it is unable to univocally determine the reading only from the notation in the external recognition result 11.

Embodiment 4

Figure 9:
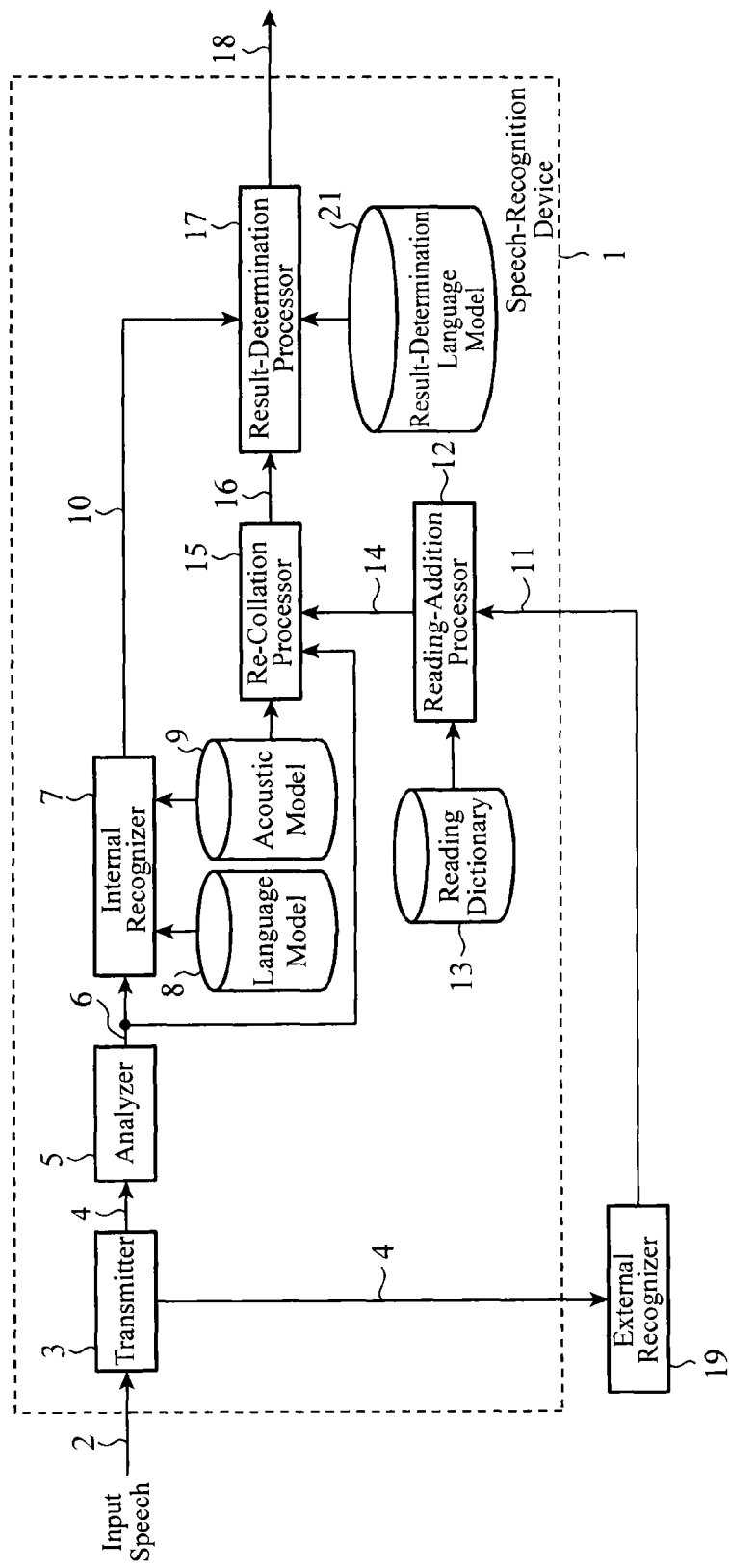
FIG. 9 is a block diagram showing a configuration of a speech-recognition device according to Embodiment 4 of the invention.

FIG. 9 is a block diagram showing a configuration of a speech-recognition device 1 according to Embodiment 4. In FIG. 9, the same reference numerals are given to the same or equivalent parts as those in FIG. 1 and FIG. 6, so that their description is omitted here. In the speech-recognition device 1 according to Embodiment 4, a result-determination language model is added and the operation of the result-determination processor 17 is modified as described below.

As the result-determination language model 21 shown in FIG. 9, any model may be used so long as it gives a likelihood for a word or a sequence of a plurality of words. In Embodiment 4, description will be made using as an example, a case where a unigram language model for words is used as the result-determination language model 21. An example of details of the result-determination language model 21 is shown in FIG. 10. Shown at the first column are notations of words, and at the second column are language likelihoods thereof. The result-determination language model 21 has been prepared beforehand using a database of a large number of words. For example, when it is assumed to be a unigram language model as in this example, probabilities of occurrence of the respective words have been calculated from the database of the large number of words, and logarithmic values of the probabilities of occurrence have been recorded as their likelihoods in the result-determination language model 21.

Next, operations at the time of speech recognition will be described.

When a user makes a speech, using the speech as an input, the transmitter 3, the analyzer 5, the internal recognizer 7, the reading-addition processor 12 and the re-collation processor 15 perform the same operations as those in Embodiment 1, to thereby output the internal recognition result 10 from the internal recognizer 7 and output the re-collation result 16 from the re-collation processor 15, to the result-determination processor 17.

The result-determination processor 17 refers to the result-determination language model 21 to thereby calculate a language likelihood Sl for each of the internal recognition result 10 and the re-collation result 16. For example, when the notation in the internal recognition result 10 is "Suzuka Liquor Store", its language likelihood Sl=−0.32 with reference to the result-determination language model 21 of FIG. 10. Likewise, when the notation in the re-collation result 16 is "Suzuka Slope", its language likelihood Sl=−0.30. Then, the result-determination processor 17 calculates a total likelihood S according to the following formula (1), for each of the internal recognition result 10 and the re-collation result 16. In the formula (1), Sa is an acoustic likelihood and w is a constant experimentally-determined beforehand which is, for example, given as w=10.

$$S = Sa + w \times Sl \quad (1)$$

The result-determination processor 17 sorts the recognition results in the internal recognition result 10 and the re-collation result 16 in descending order of the total likelihood S, and outputs them as the final recognition result 18.

Consequently, according to Embodiment 4, the speech-recognition device 1 is configured to include the result-determination language model 21 in which pairs of words and language likelihoods thereof are stored, wherein the result-determination processor 17 calculates, using the result-determination language model 21, the language likelihood of the internal recognition result 10 and the language likelihood of the re-collation result 16 (namely, the external recognition result 11), and compares the acoustic likelihood and the language likelihood of the internal recognition result 10 with the acoustic likelihood and the language likelihood of the re-collation result 16, to thereby determine the final recognition result. Thus, the language likelihood Sl is calculated for each of the internal recognition result 10 and the re-collation result 16 by using the same result-determination language model 21, so that comparison in consideration of the language likelihood Sl can be made therebetween, thus providing an effect that the recognition accuracy is improved.

Note that in Embodiment 4, as the result-determination language model 21, an example has been described that uses unigram of word; however, this is not limitative, and any one of static language models of (n-gram) including those of bigram, trigram and the like, may be used.

Note that in Embodiment 4, description has been made about a case where, with respect to the speech-recognition device 1 of Embodiment 1, the result-determination language model 21 is added and the operation of the result-determination processor 17 is modified; however, with respect also to the speech-recognition device 1 of Embodiment 2 or 3, similarly, the result-determination language model 21 may be added and the operation of the result-determination processor 17 may be modified.

Further, in Embodiments 1 to 4, the external recognition result 11 received from a single external recognizer 19 is used; however, a plurality of external recognition results 11 received from a plurality of external recognizers 19 may be used. Further, the result-determination processor 17 is configured to output the recognition results sorted in descending order of the acoustic likelihood or the like, as the final recognition result 18; however, this is not limitative, and it may be configured so that just a predetermined number of results in descending order of the acoustic likelihood may be outputted as the final recognition result 18, or likewise.

Other than the above, unlimited combination of the respective embodiments, modification of any element in the embodiments and omission of any element in the embodiments may be made in the present invention without departing from the scope of the invention.

INDUSTRIAL APPLICABILITY

As described above, the speech-recognition device according to the invention is configured to calculate, using the same acoustic model, the acoustic likelihood of the internal recognition result and the acoustic likelihood of the external recognition result, to thereby compare them with each other. Thus, it is suited to use for a client-side car-navigation device, smartphone and the like, that constitute client-server speech-recognition systems.

DESCRIPTION OF REFERENCE NUMERALS AND SIGNS

1: speech-recognition device, 2: input speech, 3: transmitter, 4: speech data, 5: analyzer, 6: feature vector, 7: internal recognizer, 8: language model, 9: acoustic model, 10: internal recognition result, 11: external recognition result, 12: reading-addition processor, 13: reading dictionary, 14: reading-added result, 15: re-collation processor, 16, 16a: re-collation results, 17: result-determination processor, 18: final recognition result, 19: external recognizer, 20: second acoustic model, 21: result-determination language model.

The invention claimed is:

1. A speech-recognition device which acquires an internal recognition result from its recognition processing of input speech data and an external recognition result from recognition processing of said input speech data by one or more external recognition devices external to the speech-recognition device to determine a final recognition result, the speech-recognition device comprising:
   memory including:
      an acoustic model in which feature quantities of speeches are modeled;
      a language model in which notations and readings of recognition-object words of the speech-recognition device are stored; and
      a reading dictionary in which pairs of the notations and the readings of the recognition-object words and words other than the recognition-object words are stored; and
   circuitry configured to:
      transmit said input speech data to the one or more external recognition devices;
      analyze the input speech data to calculate a feature vector;
      perform, using the acoustic model, pattern collation between the calculated feature vector and each word stored in the language model to calculate their respective acoustic likelihoods;
      output, as the internal recognition result, a corresponding notation, a corresponding reading, and a corresponding acoustic likelihood of top one or more high-ranking words;
      acquire the external recognition result from recognition processing of the input speech data by the one or more external recognition devices, extract a reading corresponding to a notation included in said external recognition result using the reading dictionary, and output a result composed of said external recognition result and the extracted reading;
      perform, using the acoustic model, pattern collation between the calculated feature vector and the output result to calculate an acoustic likelihood for the external recognition result; and
      compare the corresponding acoustic likelihood of the internal recognition result with the acoustic likelihood of the external recognition result to determine the final recognition result.

2. The speech-recognition device of claim 1,
   wherein the memory includes a second acoustic model different to the acoustic model,
   wherein the circuitry is configured to perform, using the second acoustic model, pattern collation between the calculated feature vector and the internal recognition result to calculate the acoustic likelihoods for the internal recognition result, and perform pattern collation between the feature vector and the output result to calculate the acoustic likelihood for the external recognition result, and
   wherein the circuitry is configured to determine the final recognition result by comparing the corresponding acoustic likelihood of the internal recognition result and the acoustic likelihood of the external recognition result.

3. The speech-recognition device of claim 1,
   wherein the circuitry is configured to, when there are a plurality of readings as candidates for the external recognition result, output the result in which said plurality of readings are included, and
   wherein the circuitry is configured to perform pattern collation for each of the plurality of readings included in the output result to calculate respective acoustic likelihoods, select therefrom a reading whose acoustic likelihood is highest, and output the reading whose acoustic likelihood is the highest.

4. The speech-recognition device of claim 1,
   wherein the memory includes a result-determination language model in which pairs of words and language likelihoods are stored, and
   wherein the circuitry is configured to calculate, using the result-determination language model, a language likelihood of the internal recognition result and a language likelihood of the external recognition result, and compare the corresponding acoustic likelihood and the language likelihood of the internal recognition result with the acoustic likelihood and the language likelihood of the external recognition result to determine the final recognition result.

5. The speech-recognition device of claim 4, wherein the result-determination language model is a static n-gram language model.

6. The speech-recognition device of claim 1, wherein the extracted reading for said external recognition result corresponds to a symbol sequence associated with the acoustic model.

7. The speech-recognition device of claim 1, wherein the feature vector is a Mel Frequency Cepstral Coefficient (MFCC).

8. The speech-recognition device of claim 1, wherein the circuitry is configured to use a Viterbi algorithm for said pattern collation between the calculated feature vector and each word stored in the language model, and for said pattern collation between the calculated feature vector and the output result.

9. The speech-recognition device of claim 1, wherein the acoustic model is a Hidden Markov Model (HMM).

10. A speech-recognition method of acquiring an internal recognition result from recognition processing of input speech data performed in a speech-recognition device and an external recognition result obtained from recognition processing of said input speech data by one or more external recognition devices external to the speech-recognition device to determine a final recognition result, the speech-recognition method comprising:

transmitting the input speech data to the one or more external recognition devices;

analyzing the input speech data to calculate a feature vector;

performing, using an acoustic model in which feature quantities of speeches are modeled, pattern collation between the calculated feature vector and each word stored in a language model in which notations and readings of recognition-object words of the speech-recognition device are stored to calculate their respective acoustic likelihoods;

outputting, as the internal recognition result, a corresponding notation, a corresponding reading, and a corresponding acoustic likelihood of top one or more high-ranking words;

acquiring the external recognition result from recognition processing of the input speech data by the one or more external recognition devices, extracting a reading corresponding to a notation included in said external recognition result using a reading dictionary in which pairs of the notations and the readings of the recognition-object words and words other than the recognition-object words are stored, and outputting a result composed of said external recognition result and the extracted reading;

performing, using the acoustic model, pattern collation between the calculated feature vector and the output result to calculate an acoustic likelihood for the external recognition result; and comparing the corresponding acoustic likelihood of the internal recognition result with the acoustic likelihood of the external recognition result to determine the final recognition result.

\* \* \* \* \*